(12) United States Patent
Edmisten

(10) Patent No.: US 7,344,006 B2
(45) Date of Patent: Mar. 18, 2008

(54) PISTON ASSEMBLY FOR USE IN A BRAKE ASSEMBLY

(75) Inventor: Frank Edmisten, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 373 days.

(21) Appl. No.: 10/792,544

(22) Filed: Mar. 3, 2004

(65) Prior Publication Data
US 2005/0194220 A1 Sep. 8, 2005

(51) Int. Cl.
*F16D 55/36* (2006.01)
(52) U.S. Cl. ............... 188/71.5; 188/73.1; 188/206 R
(58) Field of Classification Search ............... 188/71.1, 188/71.5, 73.1, 195, 206 R, 218 R, 264 G
See application file for complete search history.

(56) References Cited
U.S. PATENT DOCUMENTS 3,113,646 A * 12/1963 Airheart et al. .......... 188/196 P
4,180,147 A * 12/1979 Tjarksen et al. ........... 188/71.8
5,205,382 A * 4/1993 Edmisten .................. 188/71.5
5,219,046 A * 6/1993 Clark ....................... 188/71.8
5,423,401 A * 6/1995 Noah et al. ................ 188/203
5,542,504 A * 8/1996 Berwanger ................ 188/71.8
6,132,135 A * 10/2000 Gerber et al. .............. 464/179
6,729,445 B1 * 5/2004 Qian et al. .............. 188/264 G

* cited by examiner

*Primary Examiner*—Melody M. Burch
(74) *Attorney, Agent, or Firm*—Kathleen K. Bowen

(57) ABSTRACT

A piston assembly for use in a brake assembly has a piston sleeve having a first end, a second end, an external radius, an internal radius, and a cap on the piston sleeve second end. The cap has a first end, a middle portion, and a second end. The cap first end has an external radius and the cap second end has an external radius, wherein the cap first end external radius is smaller than the cap second end external radius. The middle portion is stepped to transition from the cap first end external radius to the cap second end external radius. The cap first end external radius is such that the cap first end slides into the piston sleeve. The cap middle portion has a conical mating surface, and the piston sleeve second end has a corresponding conical mating surface. Further, the cap second end external radius is larger than the piston sleeve external radius.

18 Claims, 7 Drawing Sheets

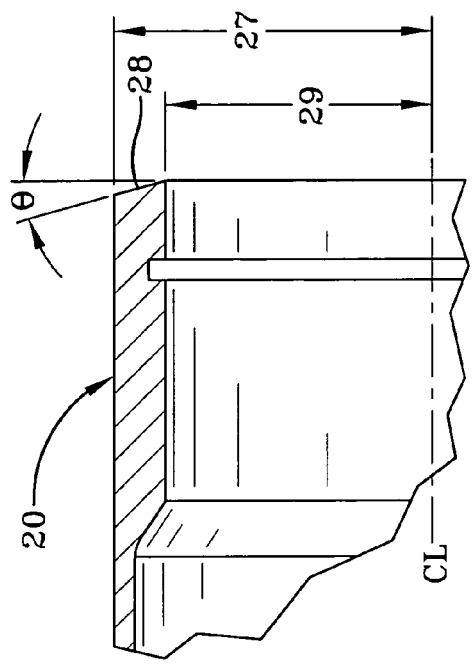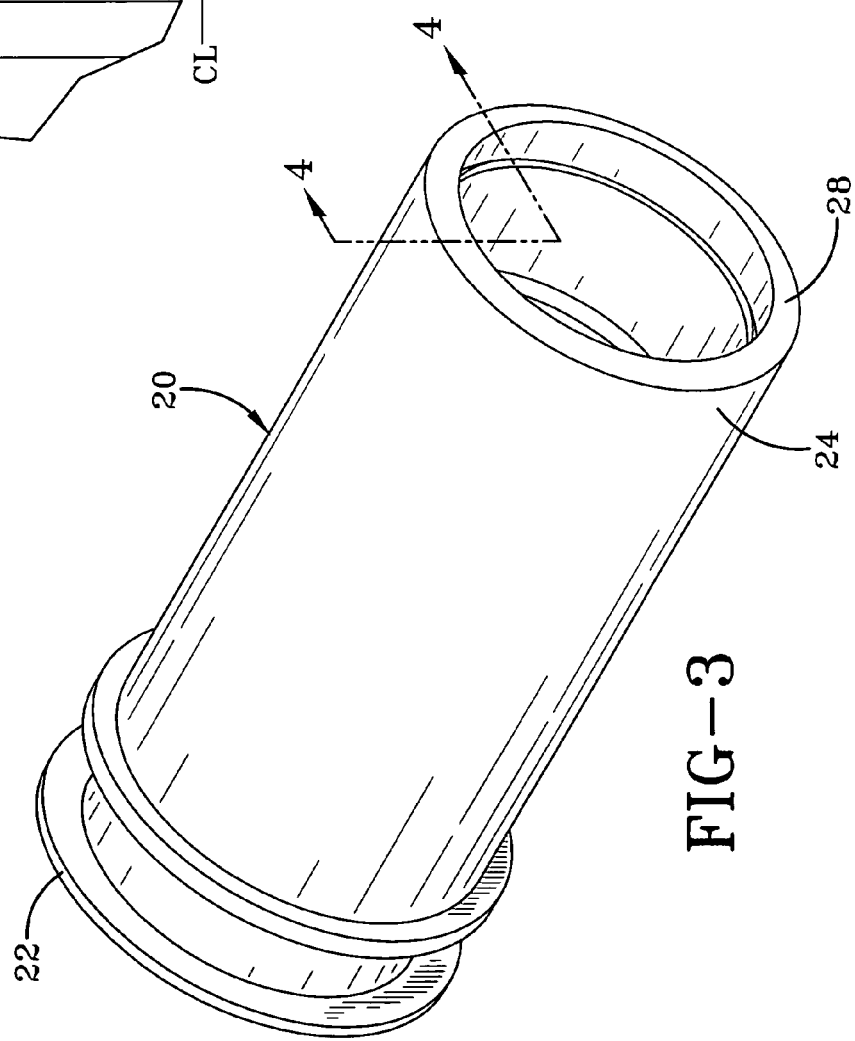

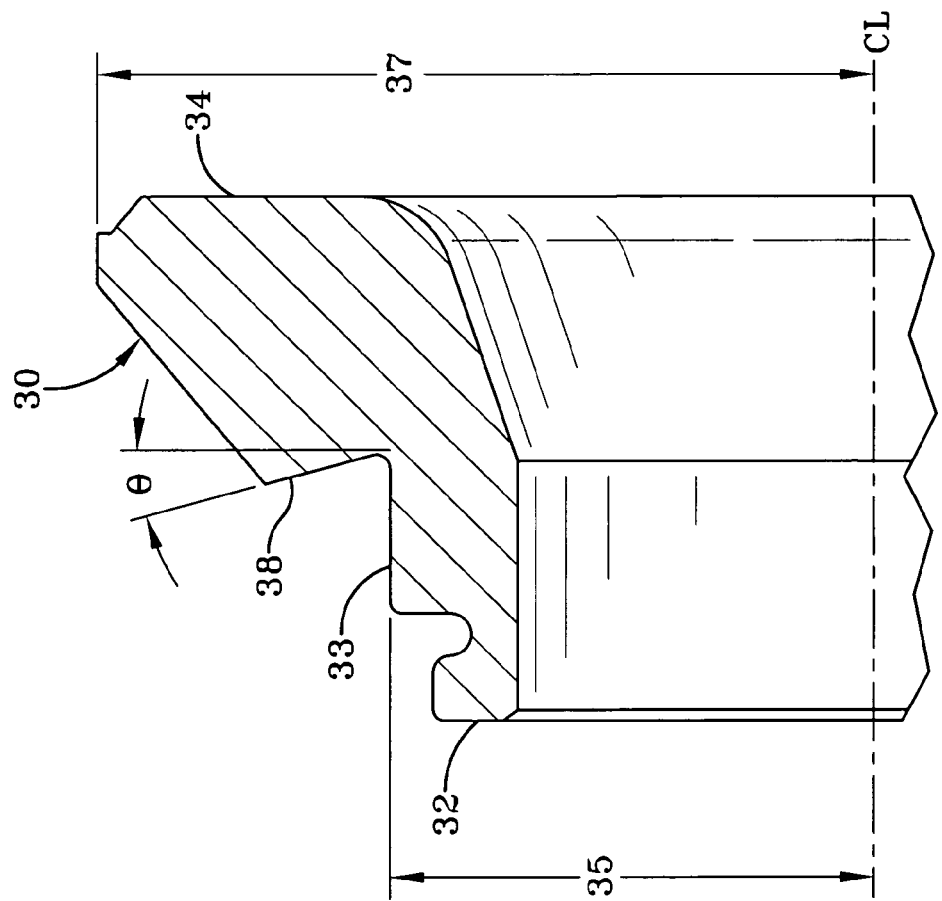
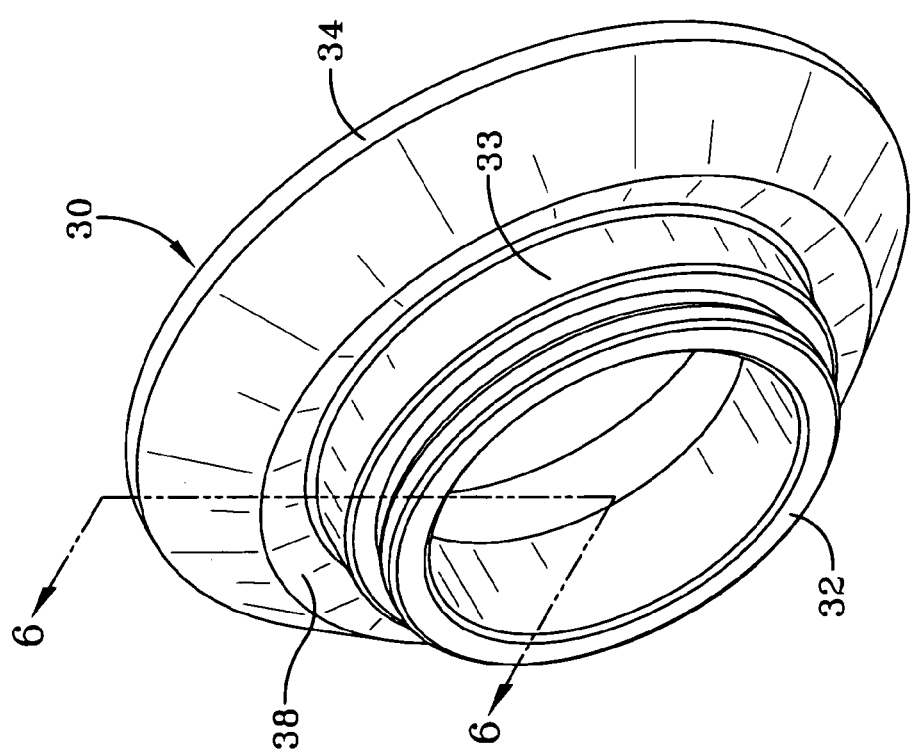
FIG-6
FIG-5

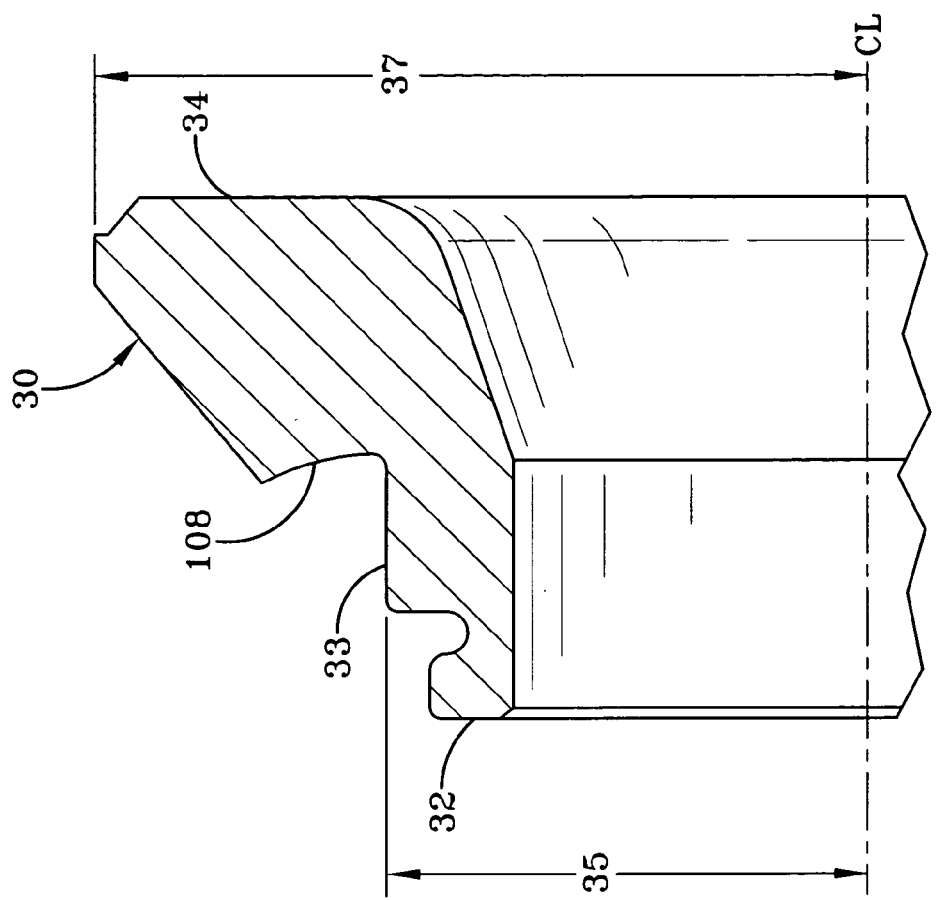
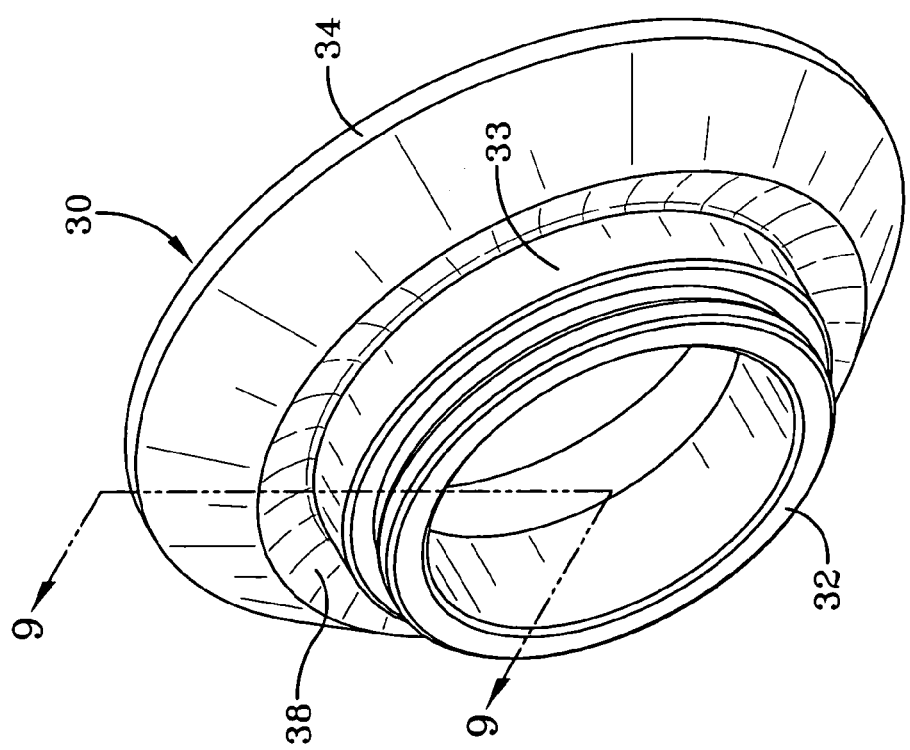

PISTON ASSEMBLY FOR USE IN A BRAKE ASSEMBLY

BACKGROUND

The present invention is in the field of braking systems. More specifically this invention relates to the piston assembly for use in a braking system.

In a braking system that has a piston or pistons applying pressure on a pressure plate via a forwardly disposed face of the piston, the piston face and the pressure plate are parallel surfaces. During braking, they encounter forces that can deflect the outer radial portions of the piston housing to cock the pistons in their housings. This action induces side loading and unnecessary stresses into the piston assembly and supporting structure Bending action increases as the brake discs wear and the piston elements must extend axially outward a greater distance for full brake application. The bending action and resultant side loading is especially harmful to assemblies that have automatic adjusters built into the pistons due to excessive wear on close clearance adjuster components, and increased difficulty in maintaining an effective seal of hydraulic fluid.

One attempt at overcoming these problems is disclosed in U.S. Pat. No. 5,205,382 by Edmisten, which is hereby incorporated by reference. This patent discloses a two-part cap with spherical mating surfaces, where the inner half of the cap mates with the forwardly disposed face of the piston, and the outer half of the cap mates with and remains parallel with the pressure plate. This allows the piston to more freely deflect with the piston housing, thus reducing side loads, and excessive wear. However, this two-part cap is difficult and expensive to manufacture.

A piston and single-piece cap are desired which would allow movement of the piston relative to the cap, so that the cap remains parallel with the pressure plate, while the piston deflects with the piston housing with minimum side loads induced into the piston and adjuster components; and which would not be difficult and expensive to manufacture.

SUMMARY OF THE INVENTION

A piston assembly for use in a brake assembly has a piston sleeve having a first end, a second end, an external radius, and an internal radius, and a cap on the piston sleeve second end. The cap has a first end, a middle portion, and a second end. The cap first end has an external radius and the cap second end has an external radius, wherein the cap first end external radius is smaller than the cap second end external radius. The middle portion is stepped to transition from the cap first end external radius to the cap second end external radius. The cap first end external radius is such that the cap first end slides into the piston sleeve. The cap middle portion has a conical mating surface, and the piston sleeve second end has a corresponding conical mating surface. Further, the cap second end external radius is larger than the piston sleeve external radius.

BRIEF DESCRIPTION OF THE DRAWINGS

FIG. 3 is an isometric view of a piston sleeve according to an aspect of the invention.

FIG. 4 is a cross sectional view of a piston sleeve according to an aspect of the invention.

FIG. 5 is an isometric view of a piston cap according to an aspect of the invention.

FIG. 6 is a cross sectional view of a piston cap according to an aspect of the invention.

FIG. 8 is an isometric view of a piston sleeve according to an aspect of the invention.

FIG. 9 is a cross sectional view of a piston sleeve according to an aspect of the invention.

DETAILED DESCRIPTION

Figure 1:
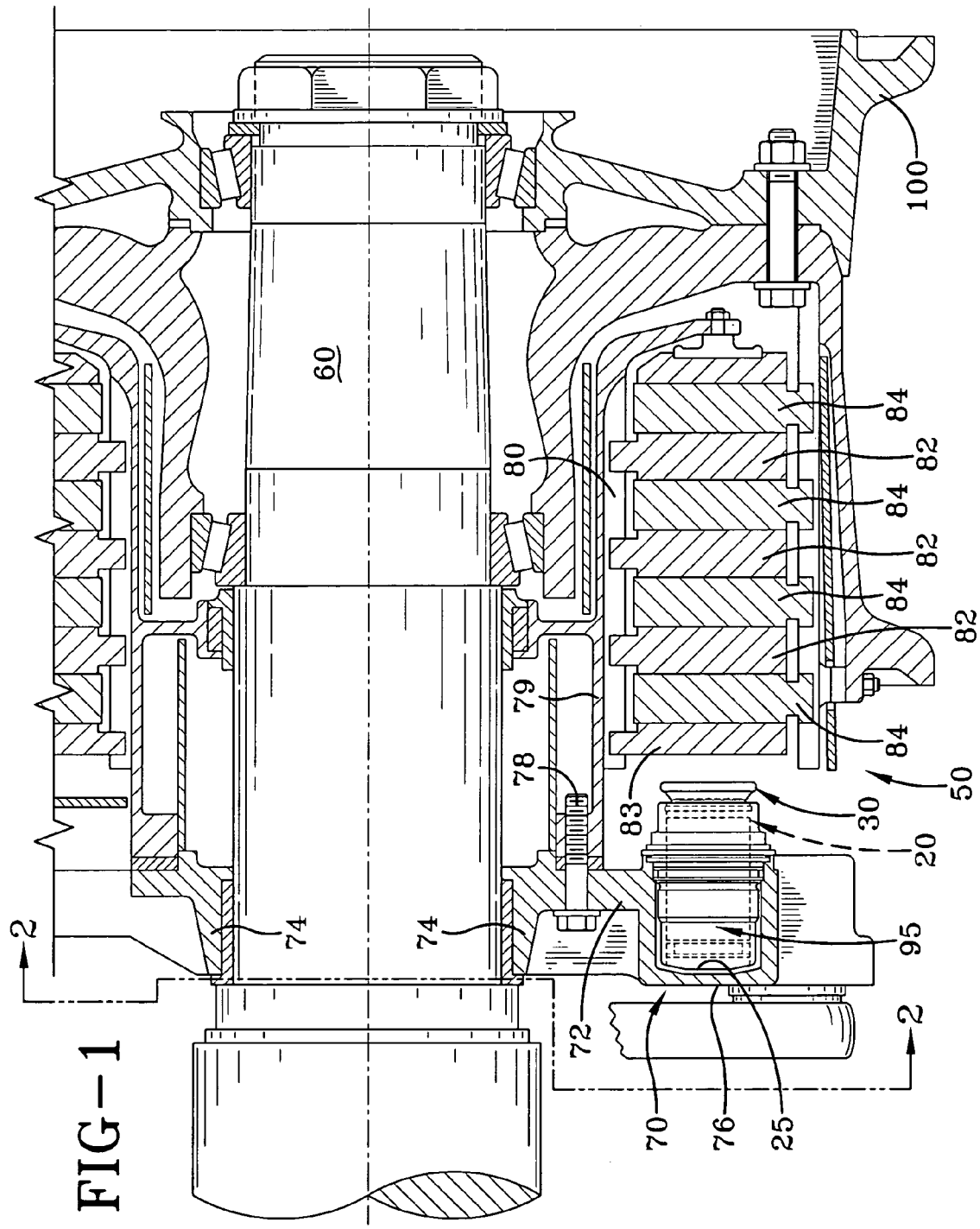
FIG. 1 is a cross sectional view of a disc brake and wheel assembly according to an aspect of the invention.
Figure 2:
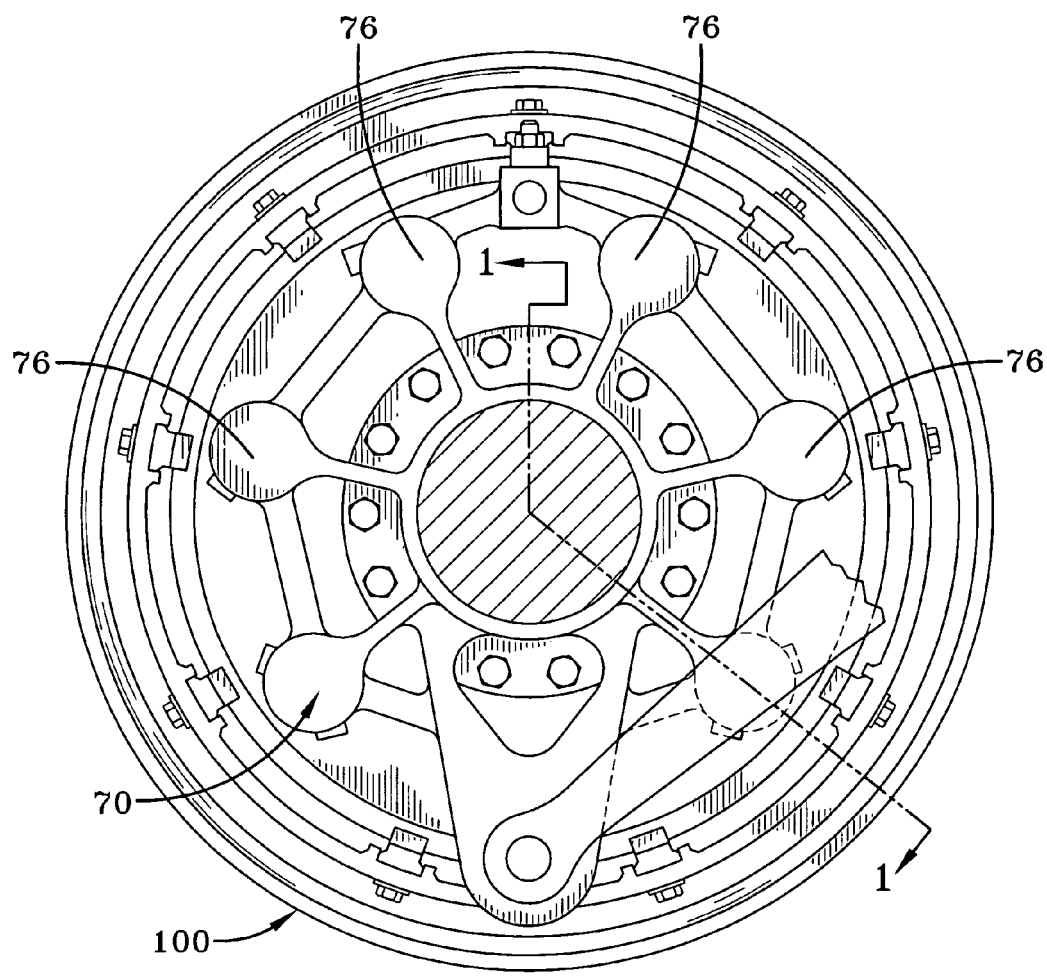
FIG. 2 is an end view of a disc brake and wheel assembly according to an aspect of the invention.
Figure 7:
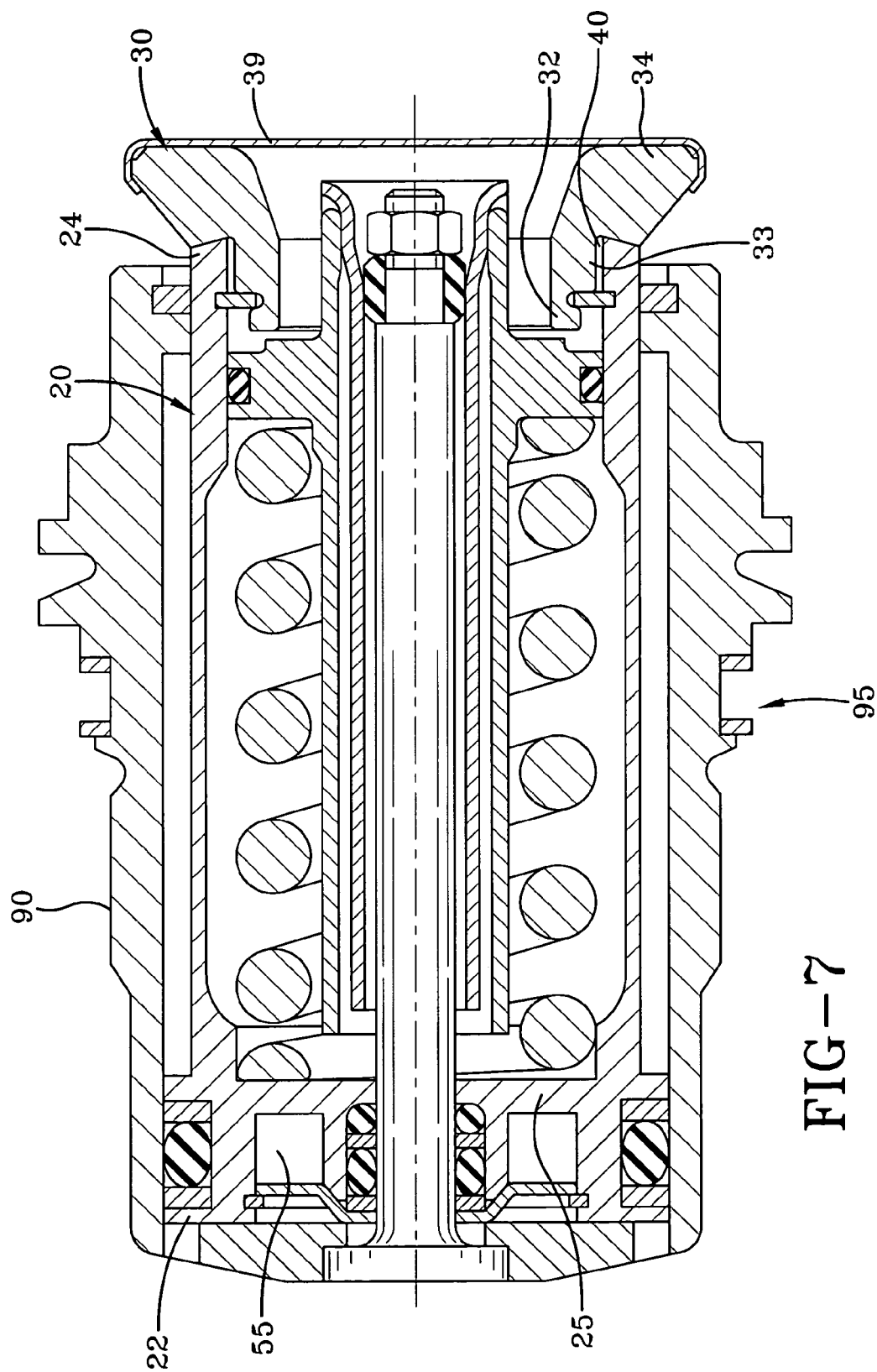
FIG. 7 is a cross sectional view of a piston housing according to an aspect of the invention.
Figure 11:
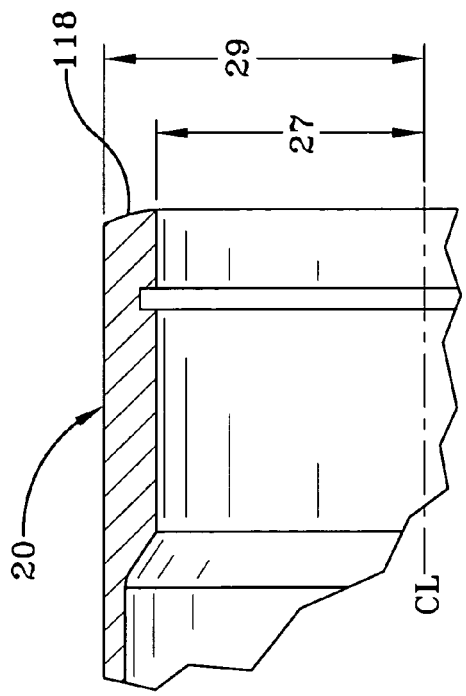
FIG. 11 is a cross sectional view of a piston cap according to an aspect of the invention.
Figure 10:
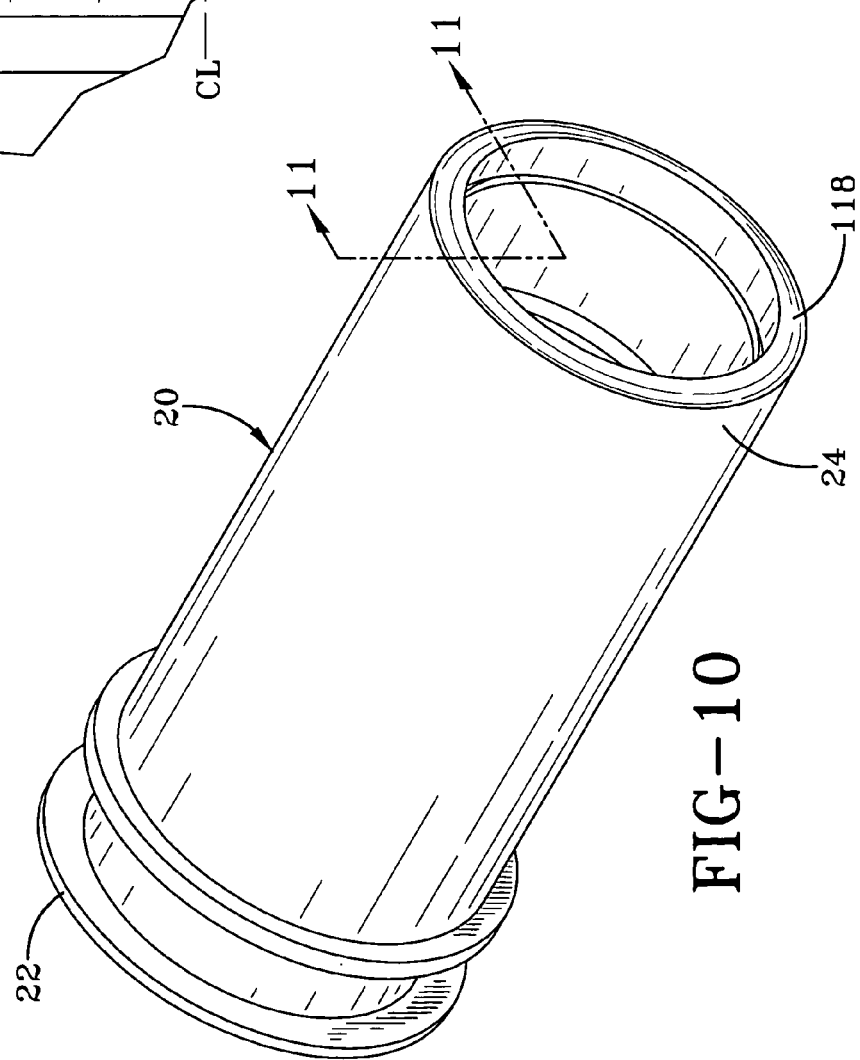
FIG. 10 is an isometric view of a piston cap according to an aspect of the invention.

Various aspects of the invention are presented in FIGS. 1-6 which are not drawn to scale and in which like components are numbered alike. Referring now to FIGS. 1-3, according to an aspect of the invention, a piston assembly 95 for use in a disc brake assembly 50 incorporating piston assemblies 95 is shown. Each piston assembly 95 has a piston sleeve 20 having a first end 22 and a second end 24, an external radius 27, and an internal radius 29, and a cap 30 on the piston sleeve second end 24. The cap 30 has a first end 32, a middle portion 33 and a second end 34. The cap first end 32 has an external radius 35 and the cap second end 34 has an external radius 37, wherein the cap first end external radius 35 is smaller than the cap second end external radius 37. The middle portion 33 is stepped to transition from the cap first end external radius 35 to the cap second end external radius 37. The cap first end external radius 35 is such that the cap first end 32 slides into the piston sleeve 20. The cap middle portion 33 has a conical mating surface 38, and the piston sleeve second end 24 has a corresponding conical mating surface 28. By conical mating surface, it is meant that the mating surface when taken as a whole is like the surface of a cone, the sides all taper to a common vertex. Further, the cap second end external radius 37 is larger than the piston sleeve external radius 27.

According to another aspect of the invention, the cap 30 is a heat insulator. In a preferred embodiment of the invention, the heat insulator material is stainless steel. In a further preferred embodiment of the invention, the heat insulator material is specifically 304L or 316L stainless steel.

According to a further aspect of the invention, the mating surface 28 and/or 38 have a dry film lubricant thereon. In a preferred embodiment of the invention, the dry film lubricant is a tungsten disulfide coating. This dry film lubricant is a surface coating, and thus is not able to be shown in a drawing.

In a further preferred embodiment of the invention, the cap conical mating surface 38 and the piston sleeve conical mating surface 28 is a taper at an angle θ. According to an aspect of the invention, the angle θ is 15 degrees.

To further aid in the movement of the piston housing relative to the cap, according to another aspect of the invention there is a radial clearance 40 between the piston sleeve internal radius 29 and the cap first end external radius 35. In a preferred embodiment of the invention, the radial clearance 40 is approximately 0.025 inches.

According to an aspect of the invention, the present invention is useful In an aircraft disc brake assembly 50 for an aircraft wheel 100. The wheel has an axle means 60, a piston support member 70 mounted on the axle means 60. The piston support member 70 (also known as a piston housing) has radially extending flange portion 72, an inner rim portion 74, and a plurality of circumferentially spaced cylinders or cylinder housings 76. The radially extending flange portion 72 is secured to a stationary hub means 78 of torque tube 79. The torque tube 79 has a plurality of axially extending ribs 80, a plurality of stator discs 82 with circumferentially spaced slots engaging the ribs for axial movement of the stator discs 82. The end stator disc closest to the pistons is also known as a pressure plate 83. Interspaced between the stator discs 82 are rotor discs 84, the rotor discs 84 interleaved between the stator discs 82 define a brake stack, which is well known in the art. Each cylinder 76 has piston cylinder 90 with an elongated piston sleeve 20 slidably mounted therein. The piston sleeve 20 has a first end 22 and a second end 24 and an external radius 27. The first end 22 of the piston sleeve 20 has an end wall 25 that is cooperative with the cylinder 90 to define a piston chamber 55 which is selectively pressurized. The piston sleeve second end 24 faces the pressure plate 83. According to an aspect of the invention, the improvement comprises piston sleeve second end 24 having a cap 30 which has a first end 32, a middle portion 33, and a second end 34. The cap first end 32 has an external radius 35 and the cap second end 34 has an external radius 37, wherein the cap first end external radius 35 is smaller than the cap second end external radius 37. The cap first end external radius 35 is such that the cap first end 32 slides into the piston sleeve 20. The middle portion 33 is stepped to transition from the cap first end external radius 35 to the cap second end external radius 37. The cap middle portion 33 has a conical mating surface 38, and the piston sleeve second end 24 has a corresponding conical mating surface 28. The cap second end external radius 37 is larger than the piston sleeve external radius 27. The cap second end 34 has a disc portion 39 operative to engage the brake stack.

According to an aspect of the invention, the piston assembly 95 has a piston sleeve 20 having a first end 22 and a second end 24, an external radius 27, and an internal radius 29, and a cap 30 on the piston sleeve second end 24. The cap 30 has a first end 32, a middle portion 33 and a second end 34. The cap first end 32 has an external radius 35 and the cap second end 34 has an external radius 37, wherein the cap first end external radius 35 is smaller than the cap second end external radius 37. The middle portion 33 is stepped to transition from the cap first end external radius 35 to the cap second end external radius 37. The cap first end external radius 35 is such that the cap first end 32 slides into the piston sleeve 20. The cap middle portion 33 has a spherical mating surface 108, and the piston sleeve second end 24 has a corresponding spherical mating surface 118. By spherical mating surface, it is meant that the mating surface when taken as a whole is like the surface of a sphere. Further, the cap second end external radius 37 is larger than the piston sleeve external radius 27.

I claim:

1. In a piston assembly for use in a brake assembly having a brake stack wherein the piston assembly has a one piece piston sleeve having a first end, a second end, an external radius, and an internal radius, and a one piece cap on said piston sleeve second end, the improvement comprising;

said cap having a first end, a middle portion and a second end, wherein said cap first end has an external radius and said cap second end has an external radius, and wherein said cap first end external radius is smaller than said cap second end external radius, and wherein the middle portion is stepped to transition from the cap first end external radius to the cap second end external radius, wherein said cap first end external radius is such that said cap first end slides into said piston sleeve, and wherein said cap middle portion has a conical mating surface, hereinafter referred to as the cap conical mating surface, for mating with said piston sleeve second end, and wherein said piston sleeve second end has a corresponding conical mating surface, hereinafter referred to as the piston sleeve conical mating surface, for mating with said cap conical mating surface, wherein said cap conical mating surface and said piston sleeve conical mating surface each have a frustoconical shape which opens away from the brake stack, and wherein said cap second end external radius is larger than said piston sleeve external radius, and wherein said cap second end further comprises a disc portion, operative to engage the brake stack.

2. The piston assembly for use in a brake assembly of claim 1 wherein said cap is a heat insulator.

3. The piston assembly for use In a brake assembly of claim 2 wherein the heat insulator is a stainless steel.

4. The piston assembly for use in a brake assembly of claim 2 wherein the heat insulator is a 304L or 316L stainless steel.

5. The piston assembly for use in a brake assembly of claim 1 wherein said cap conical mating surface and/or said piston sleeve conical mating surface have a dry film lubricant thereon.

6. The piston assembly for use in a brake assembly of claim 5 wherein said dry film lubricant is a tungsten disulfide coating.

7. The piston assembly for use in a brake assembly of claim 1 wherein said cap conical mating surface and said corresponding piston sleeve conical mating surface are each a 15 degree taper.

8. The piston assembly for use in a brake assembly of claim 1 wherein there is a radial clearance between said piston sleeve internal radius and said cap first end external radius.

9. The piston assembly for use in a brake assembly of claim 8 wherein said radial clearance between said piston sleeve internal radius and said cap first end external radius is approximately 0.025 inches.

10. In an aircraft disc brake assembly having an axle means, a piston support member mounted on the axle means, wherein said piston support member has a radially extending flange portion, an inner rim portion, and a plurality of circumferentially spaced cylinders or cylinder housings, wherein said radially extending flange portion is secured to a stationary torque tube hub means of a stationary torque tube;

wherein said torque tube has a plurality of axially extending ribs, a plurality of stator discs with circumferentially spaced slots engaging said ribs for axial movement of said stator discs, wherein there is an end stator disc called a pressure plate; interspaced between said stator discs are rotor discs, said rotor discs interleaved between said stator discs define a brake stack, each said circumferentially spaced cylinder has a piston cylinder with an elongated one piece piston sleeve slidably mounted therein, wherein said piston sleeve has a first end and a second end, an external radius and an internal radius, said first end of said piston sleeve has an end wall that is cooperative with said cylinder to define a piston chamber which is selectively pressurized, the improvement comprising;

wherein said second end of said piston sleeve has a one piece cap having a first end, a middle portion and a second end, wherein said cap first end has an external radius and said cap second end has an external radius, wherein said cap first end external radius is smaller than said cap second end external radius, and wherein the middle portion is stepped to transition from the cap first end external radius to the cap second end external radius, wherein said cap first end external radius is such that said cap first end slides into said piston sleeve, and wherein said cap middle portion has a conical mating surface, hereinafter referred to as the cap conical mating surface, for mating with said piston sleeve second end and wherein said piston sleeve second end has a corresponding conical mating surface, hereinafter referred to as the piston sleeve conical mating surface, for mating with said cap conical mating surface, and wherein said cap second end external radius is larger than said piston sleeve external radius, further, wherein said cap second end has a disc portion operative to engage said brake stack.

11. The aircraft disc brake assembly of claim 10 wherein said cap is a heat insulator.

12. The aircraft disc brake assembly of claim 11 wherein the heat insulator is a stainless steel.

13. The aircraft disc brake assembly of claim 11 wherein the heat insulator is a 304L or 316L stainless steel.

14. The aircraft disc brake assembly of claim 10 wherein said cap conical mating surface and/or said piston sleeve conical mating surface have a dry film lubricant thereon.

15. The aircraft disc brake assembly of claim 14 wherein said dry film lubricant is a tungsten disulfide coating.

16. The aircraft disc brake assembly of claim 10 wherein said cap conical mating surface and said corresponding piston sleeve conical mating surface are each a 15 degree taper.

17. The aircraft disc brake assembly of claim 10 wherein there is a radial clearance between said piston sleeve internal radius and said cap first end external radius.

18. The aircraft disc brake assembly of claim 17 wherein said radial clearance between said piston sleeve internal radius and said cap first end external radius is approximately 0.025 inches.

* * * * *